(12) United States Patent
Nakanishi et al.

(10) Patent No.: US 12,147,939 B2
(45) Date of Patent: Nov. 19, 2024

(54) SYSTEM, METHOD, AND APPARATUS FOR MANAGEMENT OF REMOTE DEVICE REPLENISHMENT, WITH PROCESSING RESOURCE CONSERVING AUTOMATIC SUSPENDING—AUTOMATIC RESUMING MANAGEMENT PROCESSING

(71) Applicant: SORACOM, INC., Tokyo (JP)

(72) Inventors: Kazuki Nakanishi, Tokyo (JP); Hironori Saitoh, Tokyo (JP); Yusuke Matsumoto, Tokyo (JP)

(73) Assignee: SORACOM, INC., Tokyo (JP)

( * ) Notice: Subject to any disclaimer, the term of this patent is extended or adjusted under 35 U.S.C. 154(b) by 220 days.

(21) Appl. No.: 17/834,469

(22) Filed: Jun. 7, 2022

(65) Prior Publication Data

US 2022/0300895 A1      Sep. 22, 2022

Related U.S. Application Data

(63) Continuation of application No. PCT/JP2021/000505, filed on Jan. 8, 2021.

(30) Foreign Application Priority Data

Feb. 17, 2020    (JP) ................................ 2020-024441

(51) Int. Cl.
*G06Q 10/087* (2023.01)
*G06Q 20/00* (2012.01)

(52) U.S. Cl.
CPC ................. *G06Q 10/087* (2013.01)

(58) Field of Classification Search
CPC .............................. G06Q 10/087; G06Q 10/00

USPC .......................................................... 705/28
See application file for complete search history.

(56) References Cited

U.S. PATENT DOCUMENTS

| | | | |
|---|---|---|---|
| 7,272,576 B2 * | 9/2007 | Matsugi | G06Q 30/04 |
| | | | 705/26.1 |
| 10,803,510 B2 * | 10/2020 | Nagasaki | H04N 1/00244 |

FOREIGN PATENT DOCUMENTS

| | | |
|---|---|---|
| JP | H07246758 A | 9/1995 |
| JP | 2002079688 A | 3/2002 |
| JP | 2004240110 A | 8/2004 |
| JP | 200511249 A | 4/2005 |

(Continued)

*Primary Examiner* — Garcia Ade
(74) *Attorney, Agent, or Firm* — WC&F IP

(57) ABSTRACT

A device management apparatus according to one embodiment of the present invention for managing a plurality of devices which consume or deplete a product, said apparatus having a storage for storing device identification information and provider information in association with one another, a receiving unit for receiving device identification information and product information which has been transmitted by a device among the plurality of devices, a determination unit for determining whether or not the consumption status or depletion status expressed by the product information satisfies determination conditions, and a notification unit which, when the determination unit has determined that the determination conditions are met, notifies a provider device which is associated with the provider identified on the basis of the provider information associated with the device identification information about an action which pertains to a product which is consumed or depleted by the device identified by the device identification information.

14 Claims, 9 Drawing Sheets

(56) References Cited

FOREIGN PATENT DOCUMENTS

| | | | |
|---|---|---|---|
| JP | 2008203412 | A | 9/2008 |
| JP | 2016185623 | A | 10/2016 |
| JP | 2016194904 | A | 11/2016 |
| JP | 2017016095 | A | 1/2017 |
| JP | 2018205608 | A | 12/2018 |

* cited by examiner

FIG. 3A

| Device ID | Article ID | Type of device | Remaining amount/period |
|---|---|---|---|
| D001 | M001 | Beverage serving machine | 20% |
| D001 | M002 | Beverage serving machine | 50% |
| D002 | – | Electric toothbrush | 5 days |
| D003 | M003 | Printing machine | 90% |
| D004 | – | Electric shaver | 10 days |

FIG. 3B

| Device ID | Article ID | Provider ID | Action |
|---|---|---|---|
| D001 | M001 | S001 | order |
| D001 | M001 | S002 | order |
| D001 | M002 | S001 | order |
| D002 | – | S003 | visiting |
| D003 | – | S004 | notification |

SYSTEM, METHOD, AND APPARATUS FOR MANAGEMENT OF REMOTE DEVICE REPLENISHMENT, WITH PROCESSING RESOURCE CONSERVING AUTOMATIC SUSPENDING—AUTOMATIC RESUMING MANAGEMENT PROCESSING

CROSS-REFERENCE TO RELAYED APPLICATIONS

The present application is a continuation application of International Application number PCT/JP2021/000505, filed on Jan. 8, 2021, which claims priority under 35 U.S.C § 119(a) to Japanese Patent Application No. 2020-024441, filed on Feb. 17, 2020. The contents of these applications are incorporated herein by reference in their entirety.

BACKGROUND OF THE INVENTION

The present disclosure relates to a device management apparatus, a device management method, and a device management system for managing a plurality of devices that consume or expend articles.

BACKGROUND OF THE INVENTION

Internet of Things (IoT) devices that perform various functions by being connected to the Internet are becoming increasingly popular. Japanese Unexamined Patent Application Publication No. 2004-240110 discloses a printing device that predicts when consumables will be used up on the basis of a remaining amount and an amount used of the consumables, and performs order processing of the consumables via a network according to the predicted time when the consumables will be used up.

In the device disclosed in Japanese Unexamined Patent Application Publication No. 2004-240110, if Application Programming Interface (API) specifications, such as data format, of ordering processing are changed, it is necessary to update firmware and other programs stored in all of the plurality of devices. In such a configuration, it is not easy to change the processing for actions related to articles (for example, ordering the articles, notification of information, and the like) because it carries the risk that the program update will fail and cause the inconvenience of not being able to perform the action until the program update is completed.

BRIEF SUMMARY OF THE INVENTION

The present disclosure focuses on this point, and an object thereof is to easily change processing for actions related to articles consumed or expended by a plurality of devices.

A first aspect of the present disclosure provides a device management apparatus for managing a plurality of devices that consume or expend an article, the apparatus includes a storage that stores device identification information for identifying at least one of the device or a user of the device in association with provider information related to a provider who provides the article, a receiving part that receives the device identification information and article information indicating a consumption state or an expending state of the article, transmitted by any of the plurality of devices, a determination part that determines whether or not the consumption state or the expending state indicated by the article information received by the receiving part satisfies a determination condition, a notification part that, on condition that the determination part determines that the determination condition is satisfied, issues a notification for an action related to the article consumed or expended by the device identified by the device identification information received by the receiving part, to a provider apparatus associated with the provider identified on the basis of the provider information associated with the device identification information received by the receiving part.

A second aspect of the present disclosure provides a device management method comprising the steps, executed by a device management apparatus for managing a plurality of devices that consume or expend an article, of receiving (i) device identification information for identifying at least one of the device or a user of the device, transmitted by any of the plurality of devices and (ii) article information indicating a consumption state or an expending state of the article, determining whether the consumption state or the expending state indicated by the article information received in the receiving satisfies a determination condition, and issuing, on condition that the determination condition is determined to be satisfied in the determining, a notification for an action related to the article consumed or expended in the device identified by the device identification information received in the receiving, to a provider apparatus associated with a provider identified on the basis of provider information relating to the provider providing the article, which is stored in the storage associated with the device identification information received in the receiving.

A third aspect of the present disclosure provides a device management system including a plurality of devices that consume or expend an article, and a device management apparatus that manages the plurality of devices, wherein each of the plurality of devices includes a detection part that detects a consumption state or an expending state of the article, and a transmission part that transmits (i) device identification information for identifying at least one of the device or a user of the device and (ii) article information indicating the consumption state or the expending state detected by the detecting part, wherein the device management apparatus includes a storage that stores the device identification information and provider information related to a provider providing the article in association with each other, a receiving part that receives the device identification information and the article information transmitted by any of the plurality of devices, a determination part that determines whether the consumption state or the expending state indicated by the article information received by the receiving part satisfies a determination condition, and a notification part that, on condition that the determination part determines that the determination condition is satisfied, issues a notification for an action related to the article consumed or expended by the device identified by the device identification information received by the receiving part, to a provider apparatus associated with the provider identified on the basis of the provider information associated with the device identification information received by the receiving part.

BRIEF DESCRIPTION OF THE DRAWINGS

FIGS. 3A and 3B show information stored in a storage of the device management apparatus.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Overview of Device Management System S]

Figure 1:
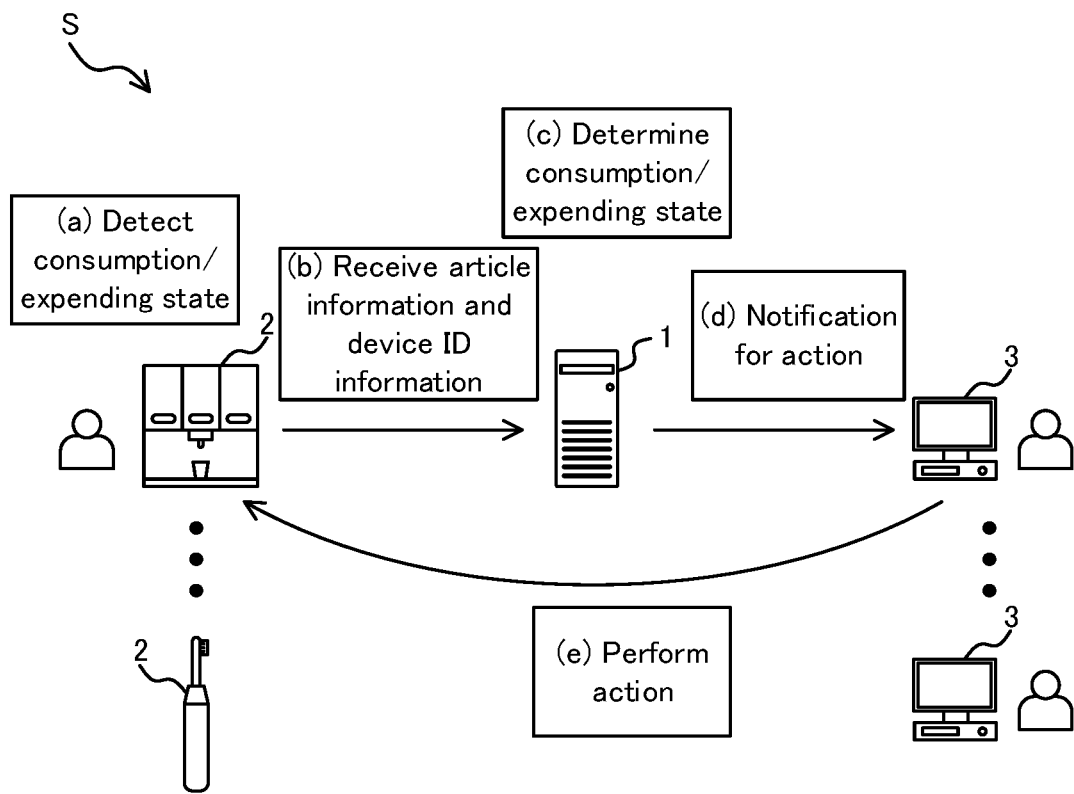
FIG. 1 shows a device management system according to the embodiment.

FIG. 1 is a schematic diagram of a device management system S according to the embodiment. The device management system S includes a device management apparatus 1, a plurality of devices 2, and a plurality of provider apparatuses 3. The device management system S may include other devices such as a server and a terminal.

The device management apparatus 1 is a computer for managing a plurality of devices, and is managed by an administrator. The administrator is a person or an operator who provides a service using the device management system S, for example. The device management apparatus 1 can communicate with the device 2 and the provider apparatus 3 via a network such as the Internet or a local area network.

The device 2 is a device used by a user, and consumes or expends an article. The user is a person or business that owns, rents, or manages the device 2, for example. The device 2 can be various types of equipment such as a beverage serving machine, a washing machine, a dishwasher, a printing machine, an electric toothbrush, an electric shaver, and the like. The article consumed or expended by the device 2 is a consumable such as a beverage, a detergent, a print cartridge, an electric toothbrush head, an electric shaver blade, and the like. In the device management system S, the plurality of devices 2 include one or more types of devices 2.

The device 2 may transmit information to the device management apparatus 1 via a server different from the device management apparatus 1. In this case, the server gives an electronic signature to the information received from the device 2, and transfers the information to the device management apparatus 1. This reduces the risk of information transmitted by the device 2 being tampered with before reaching the device management apparatus 1.

The provider apparatus 3 is a computer (for example, an information terminal or a server) associated with a provider, and receives a notification transmitted by the device management apparatus 1. The provider apparatus 3 is a server managed by the provider, a server used by the provider, and the like, for example. The provider is a person or an operator who performs an action related to an article consumed or expended by the device 2. The action performed by the provider is a task related to the article consumed or expended by the device 2 such as sending the article to the user, replenishing or replacing the article in the device 2, or notifying the provider about information about the article. The provider apparatus 3 includes a display part such as a liquid crystal display capable of displaying the information.

An outline of processing performed by the device management system S according to the present embodiment will be described below. Each of the plurality of devices 2 detects a consumption state or an expending state of the article (a). The consumption state is represented by an amount of the article used, for example. The expending state is represented by the number of times the article is used, for example. The device 2 transmits article information indicating the detected consumption state or expending state to the device management apparatus 1, together with device identification information for identifying the device 2.

The device management apparatus 1 stores in advance the device identification information in association with provider information related to the provider of the article. The device management apparatus 1 receives the device identification information and the article information transmitted by the device 2 (b). The device management apparatus 1 determines whether or not the consumption state or the expending state indicated by the received article information satisfies a determination condition (c). The determination condition is that a remaining amount of the article or a remaining period during which the article can be used is equal to or less than a predetermined reference value, for example.

On the condition that the device management apparatus 1 determines that the determination condition is satisfied, the device management apparatus 1 issues a notification for the action related to the article consumed or expended by the device 2 identified by the device identification information, to the provider apparatus 3 associated with the provider identified on the basis of the provider information associated with the device identification information (d).

The provider apparatus 3 displays the notification transmitted by the device management apparatus 1 on the display part. The provider performs the action such as sending the article to the user, replenishing or replacing the article in the device 2, or the like, on the basis of the notification displayed by the provider apparatus 3 (e).

As described above, in the device management system S according to the present embodiment, the device management apparatus 1 (i) determines whether or not the determination condition related to the article consumed or expended by the device 2 is satisfied on the basis of the information received from the device 2, (ii) identifies the provider of the article, and (iii) issues the notification for the action related to the article to the provider apparatus 3 associated with the identified provider. According to such a configuration, when the processing for the action related to the article consumed or expended by the plurality of devices 2 is changed, it is not necessary to update a program of each of the plurality of devices 2, and so the processing for the action related to the article can be easily changed.

[Configuration of Device Management System S]

Figure 2:
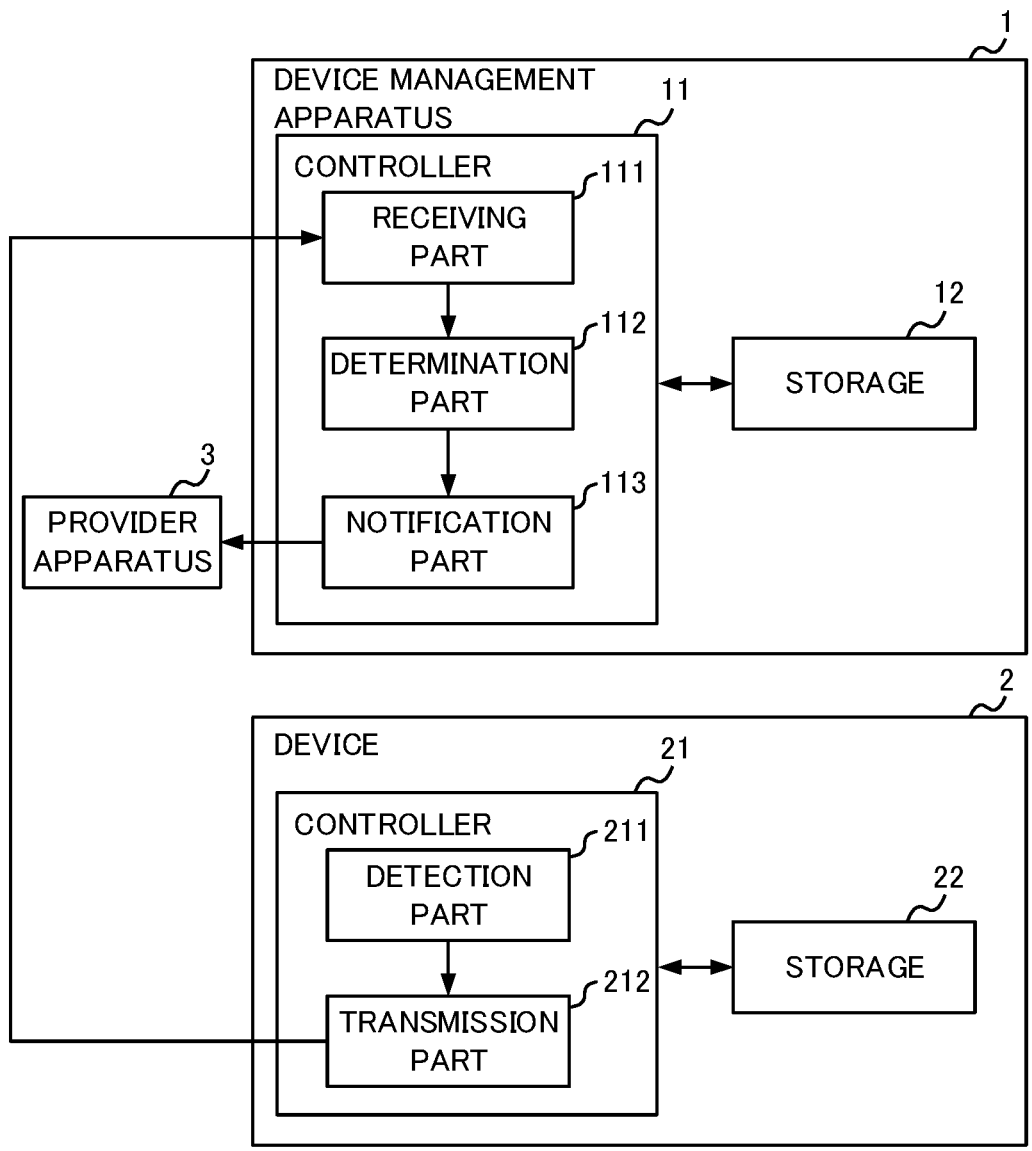
FIG. 2 shows the device management system according to the embodiment.

FIG. 2 is a block diagram of the device management system S according to the embodiment. In FIG. 2, arrows indicate main data flows, and there may be data flows other than those shown in FIG. 2. In FIG. 2, each block represents a functional unit configuration, not a hardware (device) unit configuration. Thus, the blocks shown in FIG. 2 may be implemented within a single device or may be implemented separately within a plurality of devices. Data may be exchanged between the blocks via any means, including a data bus, a network, a portable storage medium, or the like.

The device management apparatus 1 includes a controller 11 and a storage 12. The controller 11 includes a receiving part 111, a determination part 112, and a notification part 113. The controller 11 is a processor such as a Central Processing Unit (CPU), and functions as the receiving part 111, the determining part 112, and the notification part 113 by executing a program stored in the storage 12, for example. The receiving part 111 receives information from the device 2. The determination part 112 determines whether or not the information received from the device 2 satisfies the determination condition. The notification part 113 issues the notification for the action related to the article to the provider apparatus 3. Detailed processing executed by the receiving part 111, the determination part 112, and the notification part 113 will be described later.

At least a part of the function of the controller 11 may be executed by an electric circuit. Further, at least a part of the function of the controller 11 may be realized by the controller 11 executing a program executed via the network.

The storage 12 is a storage medium including a Read Only Memory (ROM), a Random Access Memory (RANI), a hard disk drive, and the like. The storage 12 stores in advance the program executed by the controller 11. The storage 12 may be provided outside the device management apparatus 1, and in this case, data may be exchanged with the controller 11 via the network.

The device 2 includes a controller 21 and a storage 22. The controller 21 includes a detection part 211 and a transmission part 212. The controller 21 is a processor such as a CPU, and functions as the detection part 211 and the transmission part 212 by executing a program stored in the storage 22, for example. The detection part 211 detects the consumption state or the expending state of the article. The transmission part 212 transmits information indicating the consumption state or the expending state of the article to the device management apparatus 1. Detailed processing executed by the detection part 211 and the transmission part 212 will be described later. At least a part of the function of the controller 21 may be executed by an electric circuit. Further, at least a part of the function of the controller 21 may be realized by the controller 21 executing a program executed via the network.

The storage 22 is a storage medium including a ROM, a RAM, a hard disk drive, and the like. The storage 22 stores in advance the program executed by the controller 21. The storage 22 may be provided outside the device 2, and in this case, data may be exchanged with the controller 21 via the network.

The device management system S according to the present embodiment is not limited to the specific configuration shown in FIG. 2. Each of the device management apparatus 1, the device 2, and the provider apparatus 3 may be configured by connecting two or more physically separated apparatuses by wire or wirelessly. Further, the device management apparatus 1 may be configured by a cloud which is a collection of computer resources.

[Description of Device Management Method]

A device management method executed by the device management system S according to the present embodiment will be described in detail below. The storage 12 of the device management apparatus 1 stores device-related information related to the plurality of devices 2 and action-related information related to the action.

FIG. 3A is a schematic diagram of the device-related information stored in the storage 12 of the device management apparatus 1. The device-related information contains (i) the device identification information (device Identification (ID)) for identifying at least one of the device 2 or the user of the device 2, (ii) the article identification information (article ID) for identifying the article, (iii) a device type indicating a type (kind) of the device 2, and (iv) remaining article information (remaining amount/remaining period) indicating a remaining amount of the article or a remaining period during which the article can be used, in association with each other. The remaining amount is represented by the remaining quantity of the article or the remaining number of times that the article can be used. The remaining period is represented by the remaining time during which the article can be used. Further, the device-related information may include usage information indicating the amount of the article used or the period of use during which the article has been used, instead of or in addition to the remaining article information.

The device identification information is a device ID assigned to the device 2 or a user ID assigned to the user of the device 2, for example. The article identification information is an article ID that is different for each type of article consumed or expended by the device 2, for example. If a single device 2 uses a plurality of types of articles, a plurality of pieces of article identification information may be associated with a piece of device identification information in the device-related information. In addition, the article identification information may be omitted if there is only one type of article that the device 2 can use.

The device type is information indicating the type (kind) of the device 2, such as a beverage serving machine, a washing machine, a dish washer, a printing machine, an electric toothbrush, an electric shaver, and the like. The device type may be represented by a character string representing the type, or may be represented by an ID assigned to the type.

The remaining article information is represented by a remaining percentage, a remaining amount, a remaining number of times, or a remaining period during which the article (that is, the article set in the device 2) can be used by the device 2, for example. The device management apparatus 1 automatically updates the remaining article information on the basis of the consumption state or the expending state received from the device 2. Further, the device management apparatus 1 may update the usage information indicating the amount used or the period of use of the article on the basis of the consumption state or the expending state received from the device 2.

The device identification information, the article identification information, and the device type contained in the device-related information may be set in advance by the administrator of the device management apparatus 1 or may be set in a user terminal (information terminal) used by the user.

FIG. 3B is a schematic diagram of the action-related information stored in the storage 12 of the device management apparatus 1. The action-related information contains (i) the device identification information (device ID), (ii) the article identification information (article ID), (iii) the provider information (provider ID) regarding the provider providing the article, and (iv) the action information indicating the action related to the article, in association with each other.

The provider information is information for identifying the provider who provides the article. The provider information is a provider ID assigned to the provider providing the article, for example. The provider information may be represented by a character string representing the provider.

The action information is information indicating the action related to the article, such as sending the article to the user, replenishing or replacing the article in the device 2, and notifying the provider about information related to the article. The action information may be represented by a character string representing the action, or may be represented by an ID assigned to the action.

If there is a plurality of providers who can provide a type of the article, a plurality of pieces of provider information may be associated with a combination of a piece of device identification information and a piece of article identification information in the action-related information. Further, if there is only one type of article that the device 2 can use (that is, the provider can be identified without using the article identification information), the article identification information may be omitted.

The device identification information, the article identification information, the provider information, and the action information included in the action-related information may be set in advance by the administrator of the device management apparatus 1 or may be set in the user terminal used by the user.

The device-related information and the action-related information are not limited to the specific formats shown in FIGS. 3A and 3B, and can be stored in the storage 12 in any format. The device-related information and the action-related information are stored in the storage 12 as a database, for example.

(Detection of Consumption State or Expending State)

When the user or the administrator sets the device-related information and action-related information shown in FIGS. 3A and 3B, the device 2 becomes available. In each of the plurality of available devices 2, the detection part 211 detects the consumption state or the expending state of the article used by the device 2.

Figure 4:
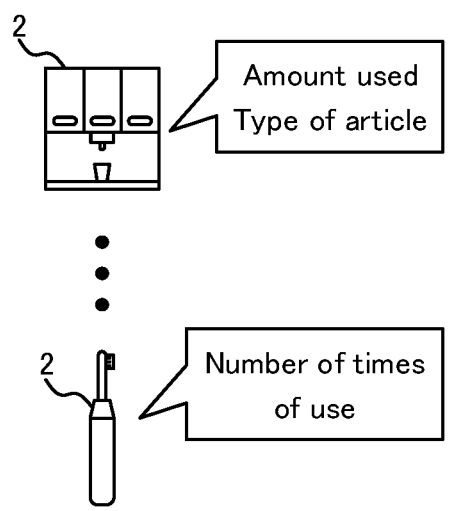
FIG. 4 shows a consumption state or an expending state detected by a detection part of a device.

FIG. 4 is a schematic diagram of the consumption state or the expending state detected by the detection part 211 of the device 2. The detection part 211 detects the amount of the article used by using a sensor included in the device 2 as the consumption state, for example. The detection part 211 detects the number of times of use or the period of use of the article by using the sensor included in the device 2 as the expending state, for example. If the device 2 uses a plurality of types of articles, the detection part 211 detects the types of articles in association with the consumption state or the expending state.

The transmission part 212 transmits the device identification information for identifying the device 2 and the article information indicating the consumption state or the expending state detected by the detection part 211, to the device management apparatus 1. Further, the transmission part 212 may transmit the article information indicating the article identification information for identifying the article to the device management apparatus 1, in addition to the consumption state or the expending state.

The transmission part 212 transmits the article information periodically or in accordance with the consumption state or the expending state. Alternatively, the transmission part 212 may transmit the article information at a timing preset by the user. Alternatively, the transmission part 212 may transmit the article information every time the article is used, and may transmit the article information every predetermined period (for example, one week) even if the article is not used.

In the device management apparatus 1, the receiving part 111 receives the device identification information and the article information transmitted by any one of the plurality of devices 2. The receiving part 111 updates the remaining article information contained in the device-related information stored in the storage 12, on the basis of the received device identification information and article information. For example, the receiving part 111 subtracts the amount used or the number of times of use, indicated by the received article information, from the remaining amount indicated by the remaining article information stored in the storage 12. For example, the receiving part 111 subtracts the period of use, indicated by the received article information, from the remaining period indicated by the remaining article information stored in the storage 12. Further, the receiving part 111 may add the amount used (number of times of use) or the period of use indicated by the received article information to the amount used or the period of use indicated by the usage information stored in the storage 12.

(Determination of Determination Condition)

Figure 5:
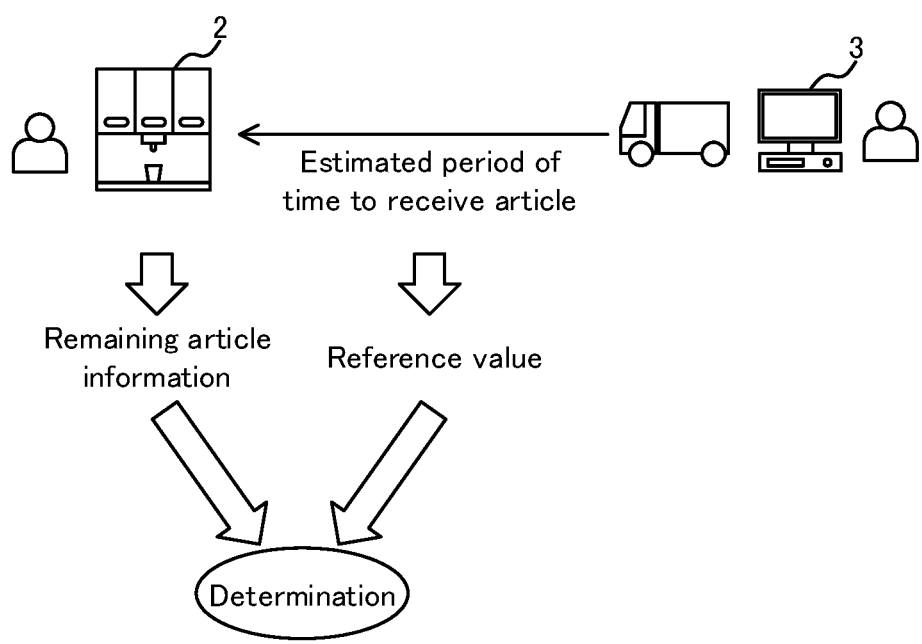
FIG. 5 shows a determination method performed by a determination part.

The determination part 112 acquires the determination condition used for determining the article information, and performs determination using the acquired determination condition. FIG. 5 is a schematic diagram illustrating a determination method performed by the determination part 112. The determination condition is a condition to issue the notification for the action related to the article to the provider apparatus 3. The determination condition is that the remaining amount or the remaining period indicated by the remaining article information is equal to or less than a predetermined reference value, for example. The determination condition may be that the amount used or the period of use indicated by the usage information is equal to or greater than the predetermined reference value. The determination condition is stored in advance in the storage 12 in association with the type of the device 2, for example. This allows the device management apparatus 1 to change the determination condition depending on the type of the device 2, such as issuing, to the user, a notification to order a beverage of a beverage serving machine that must be refilled earlier than an electric toothbrush head that is not required to be replaced.

Further, the determination condition may be set in advance by the administrator of the device management apparatus 1 or may be set in the user terminal used by the user. This allows the determination part 112 to adjust the determination condition according to the intention of the administrator or the user.

The determination part 112 may determine the reference value of the determination condition for each device 2. In this case, as shown in FIG. 5, the determination part 112 calculates an estimation period from when the notification part 113, described later, issues the notification for the action of ordering the article until when the user receives the article to the provider apparatus 3. The estimation period is calculated using the distance between a position (area) where the device 2 is installed and a position (area) of the provider, for example. Then, the determination part 112 determines the reference value of the determination condition on the basis of the calculated estimation period. For example, the determination part 112 increases the reference value as the estimation period becomes longer, and decreases the reference value as the estimation period becomes shorter. This allows the device management apparatus 1 to promptly issue a notification for an order for the device 2 whose article requires time to be delivered from the provider, such that the article can reach the user at an appropriate time.

The determination part 112 determines whether or not the remaining amount or the remaining period (or the amount used or the period of use) updated on the basis of the consumption state or the expending state indicated by the article information received by the receiving part 111 satisfies the acquired determination condition. That is, the determination part 112 determines that the determination condition is satisfied if the remaining amount or the remaining period is equal to or less than the reference value, and otherwise determines that the determination condition is not satisfied. Alternatively, the determination part 112 may determine that the determination condition is satisfied if the amount used or the period of use is equal to or greater than the reference value, and otherwise may determine that the determination condition is not satisfied. The determination part 112 is not limited to the specific determination condition disclosed here, and may perform determination using other determination conditions.

Figure 6:
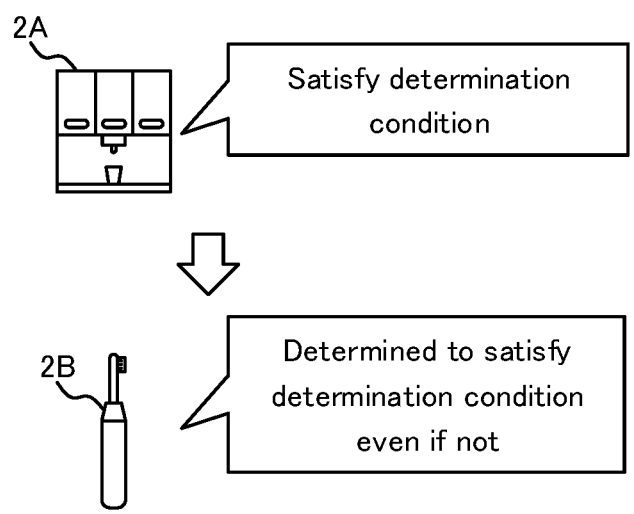
FIG. 6 shows a determination method for a plurality of devices.

The determination part 112 determines the determination condition independently for each of the plurality of devices 2. On the other hand, when a single user uses the plurality of devices 2, it is convenient to be able to send the articles used by the plurality of devices 2 to the user all together. FIG. 6 is a schematic diagram for illustrating the determination method for the plurality of devices 2. FIG. 6 shows a situation where a single user uses a first device 2A and a second device 2B.

If the determination part 112 determines that the article information received from the first device 2A satisfies the determination condition, the determination part 112 determines that the determination condition is satisfied even if the article information received from the second device 2B does not actually satisfy the determination condition. At this time, the determination part 112 may ignore the determination condition of the second device 2B, and does not have to perform the determination on the article information received from the second device 2B. Further, the determination part 112 may perform the determination on the article information received from the second device 2B using a second determination condition different from a first determination condition normally used by the second device 2B. At this time, the reference value of the second determination condition is made larger than the reference value of the first determination condition, such that the second determination condition is looser than the first determination condition.

With such a configuration, the device management apparatus 1 can loosen the determination condition for the second device 2B, and issue the notification for ordering the articles used by the plurality of devices 2 together, if the first device 2A satisfies the determination condition.

(Notification for Action)

Figure 7:
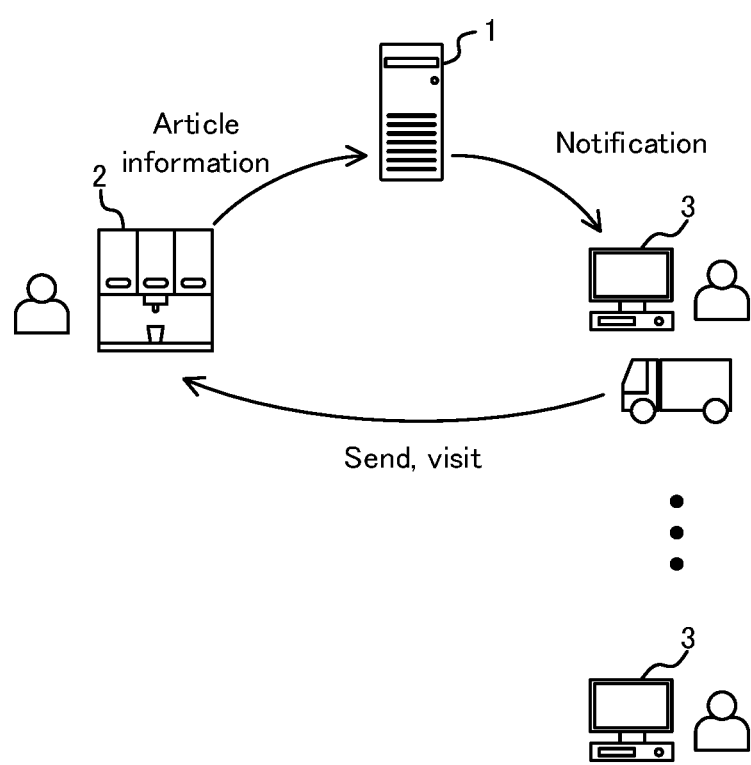
FIG. 7 shows a notification method performed by a notification part.

FIG. 7 is a schematic diagram of the notification method performed by the notification part 113. The notification part 113 identifies the provider information and the action information associated with the device identification information (or the combination of the device identification information and the article identification information) in the storage 12, on condition that the determination part 112 determines that the determination condition is satisfied.

If a plurality of pieces of provider information are associated with a piece of device identification information (or the combination of the device identification information and the article identification information), the notification part 113 selects one provider from a plurality of providers corresponding to the plurality of pieces of provider information. For example, the notification part 113 acquires, from the plurality of provider apparatuses 3 corresponding to the plurality of pieces of provider information, at least one of (i) a price for each of the plurality of providers to provide the article or (ii) a period of time required for the user to receive the article from each of the plurality of providers. Then, the notification part 113 selects one provider (for example, a provider offering the lowest price or a provider offering the fastest delivery) from the plurality of providers corresponding to the plurality of pieces of provider information, on the basis of at least one of the acquired price or period. A condition for the notification part 113 to determine which of price or period is prioritized in selecting the provider may be set in advance at the user terminal used by the user. This allows the device management apparatus 1 to dynamically change the provider providing the article to the user.

Before issuing a notification for the action to the provider apparatus 3, the notification part 113 may obtain the price for the provider to provide the article from the provider apparatus 3, and may issue, to the user terminal used by the user, notification about a price change if there has been a change in the price for the provider to provide the article compared to the past price. The user terminal displays the notification transmitted by the device management apparatus 1 on the display part. Further, if the price increases, the notification part 113 may acquire information from the user terminal indicating whether or not the user has agreed to the price increase, and may issue the notification for the action on the condition that the user has agreed to the price increase, to the provider apparatus 3. This causes the device management apparatus 1 to avoid ordering the article without the user being aware that the price has increased.

In addition, the notification part 113 may also issue the notification for the action to the provider apparatus 3 even if the determination part 112 determines that the determination condition is not satisfied, if the price has been lowered and the user has agreed to the price. This allows the device management apparatus 1 to propose that the user order the article even in a situation where the article of the device 2 is not used up, for example, if the article is reduced in price for a limited period of time.

Then, the notification part 113 issues the notification for the action indicated by the identified action information to the provider apparatus 3 associated with the provider indicated by the identified provider information. If the action is to send the article to the user, the notification part 113 issues a notification indicating a request to send the article to the user (that is, ordering the article). If the action is to replenish or replace the article in the device 2, the notification part 113 issues a notification indicating that a visit to the site where device 2 is installed is requested. Further, the notification part 113 may issue a notification with the information (device identification information, article identification information, remaining article information, and the like) related to the article satisfying the determination condition.

With such a configuration, the device management apparatus 1 can (i) determine whether or not the determination condition related to the article consumed or expended by the device 2 is satisfied, on the basis of the information received from the device 2, (ii) identify the provider of the article, and (iii) issue the notification for the action related to the article to the provider apparatus 3 associated with the identified provider.

The provider apparatus 3 displays the notification transmitted by the device management apparatus 1 on the display part. The provider apparatus 3 may output the notification by other means such as outputting sound, printing on paper, and the like. The provider performs the action related to the article in response to the notification outputted from the provider apparatus 3.

That is, the provider sends the article to the user if the notification indicates that the article is ordered. The user then replenishes or replaces the article received from the provider in the device 2. Further, if the notification indicates that the provider is requested to visit the installation site of the device 2, the provider will visit the installation site of the device 2 to replenish or replace the article in the device 2. Furthermore, the provider may also determine for himself/herself what action to take if the notification indicates the information about the article that satisfies the determination condition.

The notification part 113 may update the remaining article information or the usage information contained in the device-related information stored in the storage 12 if the notification part 113 issues a notification indicating that the article is ordered. For example, after the scheduled arrival date of the article to the user has passed, the notification part 113 adds the amount or the number of times the ordered article can be used to the remaining amount indicated by the remaining article information stored in the storage 12. For example, after the scheduled arrival date of the article for the user has passed, the notification part 113 adds the period that the ordered article can be used to the remaining period indicated by the remaining article information stored in the storage 12. Further, after the scheduled arrival date of the article for the user has passed, the notification part 113 may subtract the amount (the number of available times) or the period that the ordered article can be used from the amount used or the period of use indicated by the usage information stored in the storage 12. The scheduled arrival date is estimated using a distance between the site (area) where the device 2 is installed and the site (area) of the provider, for example. This allows the notification part 113 to automatically update the remaining article information or the usage information managed by the device management apparatus 1 in response to issuing the notification to order the article.

The determination part 112 may suspend the determination of the determination condition when the notification indicating that the article is ordered is issued. When the article is replenished or replaced in the device 2, the transmission part 212 of the device 2 transmits information indicating that the article has been replenished or replaced, to the device managing apparatus 1. The determination part 112 resumes the determination of the determination condition when the receiving part 111 receives the information indicating that the article has been replenished or replaced in the device 2. This allows the device management apparatus 1 to suppress unnecessary determination of the determination condition during the period between when the article is ordered and when the article arrives at the user.

Further, the device management apparatus 1 may issue a notification indicating that an abnormality has occurred in the device 2 or the user, on the basis of the article information received from the device 2. In this case, the device 2 transmits, to the device management apparatus 1, the article information indicating information necessary to determine the abnormality, such as the period of use of the device 2, in addition to the consumption state or the expending state. The determination part 112 determines whether the abnormality has occurred in the device 2 or the user on the basis of the article information received by the receiving part 111.

For example, the determination part 112 determines that an abnormality has occurred in the device 2 if the article information indicates that the consumption state or the expending state is outside the normal range defined in advance. Thus, the determination part 112 can determine whether or not any abnormality has occurred in the device 2 by detecting that the device 2 is consuming or expending the article to a degree different from normal. In addition, the determination part 112 may determine that an abnormality has occurred if the receiving part 111 receives no article information from the device 2 for a predetermined period of time or longer.

For example, the determination part 112 determines that an abnormality has occurred with the user if the article information indicates that the consumption state or the expending state has not changed for the predetermined period of time or longer. This allows the determination part 112 to determine that the user is immobile if the device 2 is a device used regularly, and that the user has forgotten to take medicine if the device 2 is a device used to provide medication.

If the determination part 112 determines that an abnormality (failure) has occurred in the device 2 or the user, the notification part 113 issues the notification indicating that the abnormality has occurred in the device 2 or the user to at least one of the provider apparatus 3 or the user terminal used by the user. At least one of the provider apparatus 3 or the user terminal displays the notification transmitted by the device management apparatus 1 on the display part.

Figure 8A:
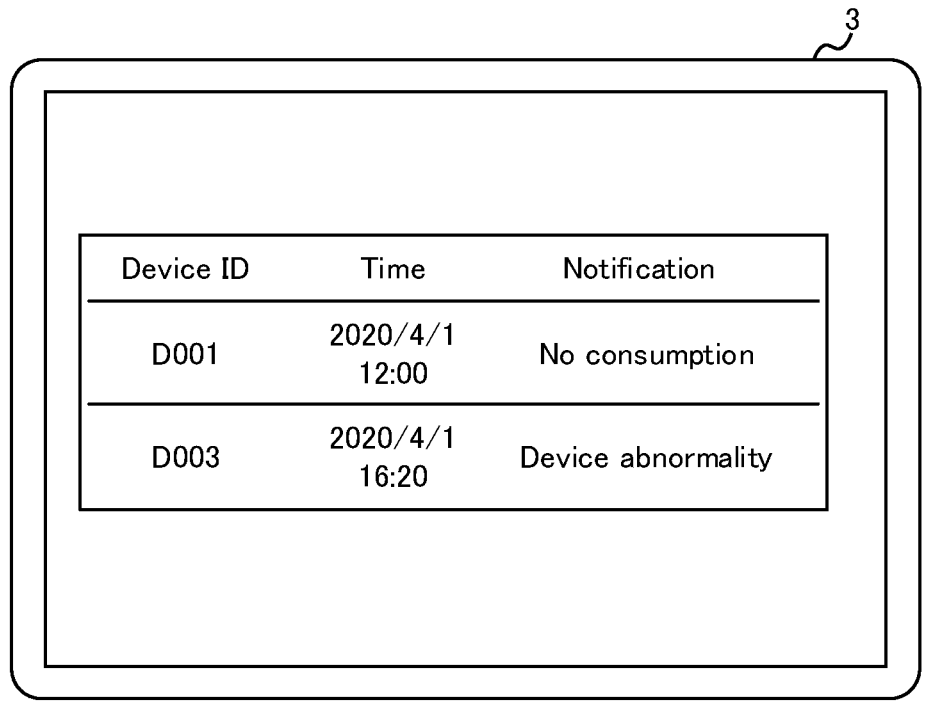
FIGS. 8A and 8B show a provider apparatus displaying information.

FIG. 8A is a front view of the provider apparatus 3 displaying the notification indicating that an abnormality has occurred. The provider apparatus 3 displays the device identification information, the time when the determination part 112 determines that the abnormality has occurred in the device 2, contents of the determination, and the like. The user terminal may display the notification indicating that the abnormality has occurred in the same manner as in FIG. 8A. This allows the provider or user to easily grasp the abnormality that has occurred in the device 2 or the user.

In addition, the device management apparatus 1 may estimate an estimated timing of ordering the article by analyzing the article information transmitted by the plurality of devices 2 in the past. In the device management apparatus 1, the receiving part 111 stores the article information received from the plurality of devices 2, in the storage 12. The notification part 113 totals the consumption state or the expending state of one or more articles for each predetermined period of time by using the article information received from the plurality of devices 2 stored in the storage 12. Then, the notification part 113 estimates the consumption state or the expending state in a future period (for example, a day, a week, or a month) on the basis of the totaled past consumption state or expending state. For example, the notification part 113 estimates the consumption state or the expending state in the same day, the same week, or the same month of the previous year as the consumption state or the expending state in the future day, week, or month. The notification part 113 may estimate the consumption state or the expending state of the future period by another method.

Then, the notification part 113 estimates the estimated timing of the order and an estimated number of articles to be ordered for each of the one or more articles on the basis of the estimated consumption state or expending state. For example, in the future period, the notification part 113 estimates, as the estimated number of articles to be ordered, the number of articles corresponding to a value obtained by subtracting the remaining amount or the remaining period of the plurality of devices 2 from the amount or the period corresponding to the estimated consumption state or expending state.

Figure 8B:
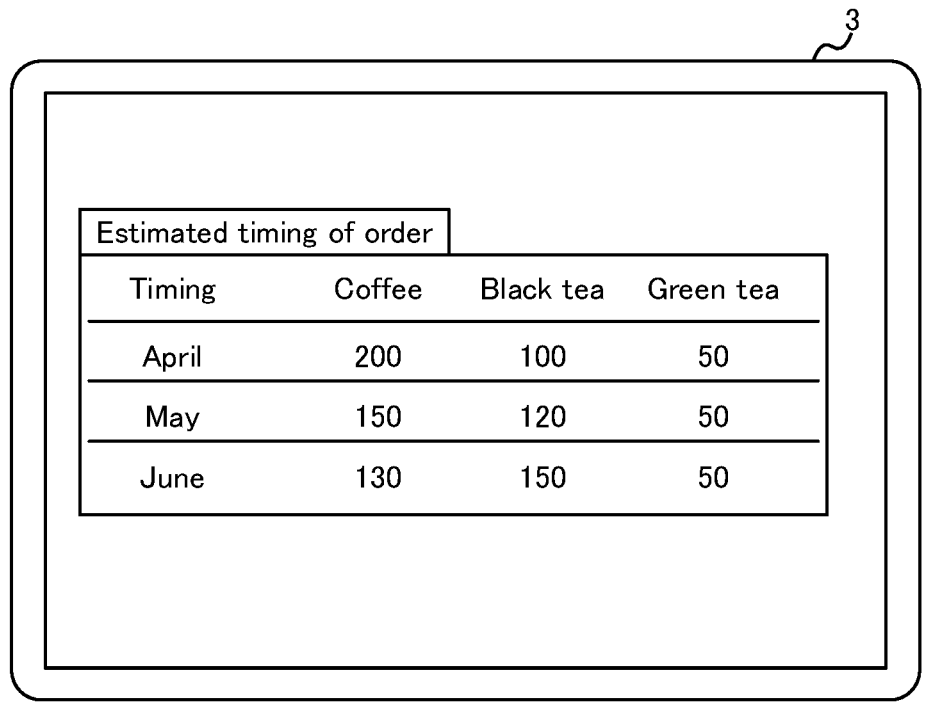

The notification part 113 issues the notification about the estimated timing of the order and the estimated number of articles to be ordered estimated by the determination part 112, to the provider apparatus 3. The provider apparatus 3 displays the notification transmitted by the device management apparatus 1 on the display part. FIG. 8B is a front view of the provider apparatus 3 displaying the estimated timing of the order and the estimated number of articles to be ordered. The provider apparatus 3 displays the estimated timing of the order and the estimated number of articles to be ordered for each article. Thus, the provider can grasp the estimated timing of the order of the article estimated on the basis of the article information transmitted by the plurality of devices 2 in the past, and can be ready to receive the order.

[Sequence of Device Management Method]

Figure 9:
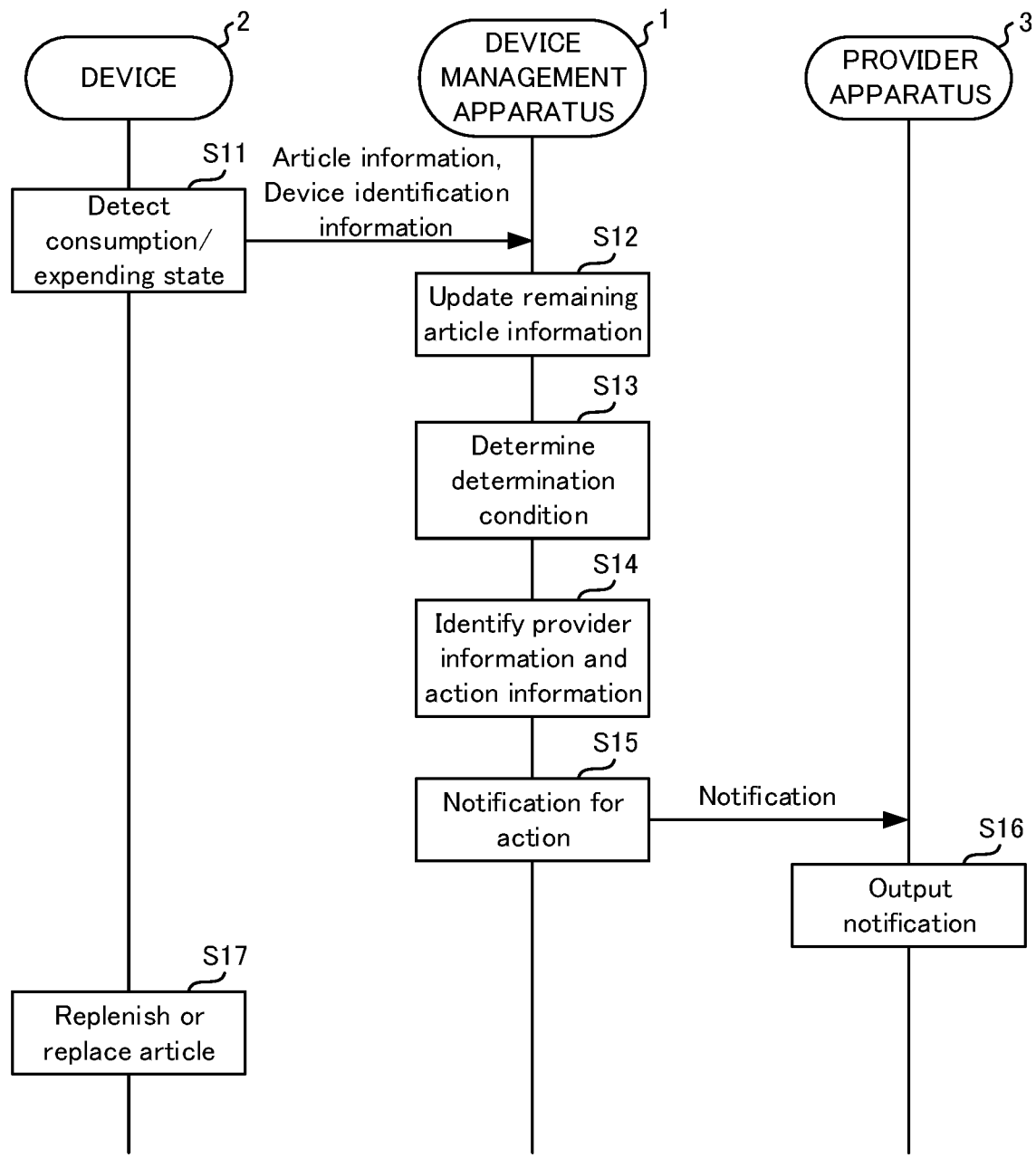
FIG. 9 shows a device management method executed by the device management system according to the embodiment.

FIG. 9 is a sequence diagram of a device management method executed by the device management system S according to the embodiment. In each of the plurality of available devices 2, the detection part 211 detects the consumption state or the expending state of the article used by the device 2 (step S11). The transmission part 212 transmits the device identification information for identifying the device 2 and the article information indicating the consumption state or the expending state detected by the detection part 211, to the device management apparatus 1. The article information may indicate the article identification information in addition to the consumption state or the expending state.

In the device management apparatus 1, the receiving part 111 receives the device identification information and the article information transmitted by any one of the plurality of devices 2. The receiving part 111 updates the remaining article information or the usage information contained in the device-related information stored in the storage 12 on the basis of the received device identification information and the article information (step S12).

The determination part 112 acquires the determination condition used for determination of the article information, and determines whether or not the remaining amount or the remaining period (or the amount used or the period of use) updated on the basis of the consumption state or the expending state indicated by the article information received by the receiving part 111 satisfies the acquired determination condition (step S13).

The notification part 113 identifies the provider information and the action information associated with the device identification information (or the combination of the device identification information and the article identification information) in the storage 12, on condition that the determination part 112 determines that the determination condition is satisfied (step S14). The notification part 113 issues the notification for the action indicated by the identified action information, to the provider apparatus 3 associated with the provider indicated by the identified provider information (step S15).

The provider apparatus 3 outputs the notification transmitted by the device management apparatus 1 by displaying on the display part, outputting sound, printing on paper, or the like (step S16). The provider performs the action related to the article in response to the notification outputted from the provider apparatus 3. The user or provider replenishes or replaces the article in the device 2 (step S17).

Effect of Embodiment

According to the device management system S of the present embodiment, the device management apparatus 1 (i) determines whether or not the determination condition related to the article consumed or expended by the device 2 is satisfied, on the basis of the consumption state or the expending state received from the device 2 and the device identification information, (ii) identifies the provider of the article, and (iii) issues the notification for the action related to the article, to the provider apparatus 3 associated with the identified provider. According to such a configuration, when changing the processing for the action related to the article consumed or expended by the plurality of devices 2, there is no need to update the program of each of the plurality of devices 2, and so the processing for the action related to said article can be easily changed.

In the device management apparatus 1, the plurality of devices 2 (that is, a plurality of devices 2 or a plurality of types of devices 2) are associated with the plurality of providers in a many-to-many manner. This allows the device management apparatus 1 to flexibly select a provider to provide the article for each of the plurality of devices 2, according to a period of time required for the provider to provide the article to the user, a price for the provider to provide the article, and other factors.

The present invention has been described above on the basis of the exemplary embodiments. The technical scope of the present invention is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

The processors of the device management apparatus 1, the device 2, and the provider apparatus 3 are the main components of the each of the steps included in the device management method shown in FIG. 9. That is, the processors of the device management apparatus 1, the device 2, and the provider apparatus 3 execute the device management method shown in FIG. 9 by reading a program for executing the device management method shown in FIG. 9 from the storage and executing said program to control each unit of the device management system S. Some of the steps included in the device management method shown in FIG. 9 may be partially omitted, the order among the steps may be changed, and a plurality of steps may be performed in parallel.

What is claimed is:

1. A processor resource conserving computer-based device management apparatus for remote managing, via a network, replenishing a plurality of devices that consume or expend respective articles, the computer-based device management apparatus comprising:
   a processor connected to the network; and
   a storage, connected to the processor, configured to store a device identification information identifying a device connected to the network or a user of the device, or both, and to store in association with the device identification information a provider information identifying a provider of the article consumed or expended by the device, and indicating a provider apparatus associated with the provider and connected to the network, and to store a processor-executable program configured to cause, when executed, the processor to configure as a plurality of functional units, including a receiving part, a determination part, and a notification part, wherein
      the receiving part is configured to receive from the network a status information transmitted by device, and including the device's device identification information and an article information indicating a consumption state or an expending state of the article, the determination part is configured to perform, responsive to the receiving part receiving the status information, a processing that determines a determination condition for the device and determines, based in part on the consumption state or the expending state indicated by the article information, whether or not the determination condition is satisfied, the notification part is configured to issue and transmit via the network to the provider apparatus, in response to the determination part determining the determination condition is satisfied, a notification for an action related to ordering the article consumed or expended by the device, the determination part is further configured to suspend, in association with the notification part issuing and transmitting the notification for the action related to ordering the article, performing the processing that determines the determination condition for the device, the receiving part is further configured to receive, from the network, a replenishment notification transmitted by the device, indicating replenishment or replacement in the device of the article, and the determination part is further configured to resume, based on the receiving part receiving the replenishment notification, performing the processing that determines the determination condition for the device.

2. The processor resource conserving computer-based device management apparatus according to claim 1, wherein:

the storage is further configured to store a device type information in association with the device identification information, indicating a type of the device, and the determination part is further configured to perform the processing in a manner wherein the determination condition is set as a determination condition associated with the type of the device indicated by the device type information stored in association with the device identification information.

3. The processor resource conserving computer-based device management apparatus according to claim 1, wherein:

the storage is further configured to store, in association with the device identification information, any of or any combination or sub-combination of a remaining amount of the article in the device, a remaining period during which the article can be consumed or expended, an amount of the article consumed or expended by the device, and a time period of use during which the article was consumed or expended, the receiving part is further configured to update, in the storage, any one among or any combination of any two or more among the remaining amount, the remaining period, the amount used, or the time period of use stored in the storage, on the basis of the consumption state or the expending state indicated by the article information included in the received status information, and the determination part processing is configured to whether the determination condition is satisfied based at least in part on whether or not the updated remaining amount, the remaining period, the amount used, or the time period of use satisfies the determination condition.

4. The processor resource conserving computer-based device management apparatus according to claim 3, wherein the notification part is further configured to automatically update, in association with the issuing and transmitting the notification to the provider apparatus, for the action to related to ordering the article the remaining amount, the remaining period, the amount used, or the period of use stored in the storage.

5. The processor resource conserving computer-based device management apparatus according to claim 3, wherein the determination part is further configured to determine a reference value on the basis of an estimation of a period of time between a that the notification part issues and transmits to the provider apparatus the notification for the action related to ordering the article and a time at which the provider replenishes the device with the article, and to determine whether or not the determination condition is satisfied using a relationship between (i) the remaining amount, the remaining period, the amount used, or the period of use and (ii) the reference value.

6. The processor resource conserving computer-based device management apparatus according to claim 1, wherein the notification part is further configured to receive, via the network, an indication that the provider has changed a price of the article and, in response, to issue and to transmit, via the network, a price change notification to a user terminal notifying a user about the change in price.

7. The processor resource conserving computer-based device management apparatus according to claim 1, wherein the notification part is further configured to issue and transmit, via the network a notification to the provider apparatus about an estimated timing of an order of the article estimated on the basis of the article information transmitted by the plurality of devices in the past.

8. The processor resource conserving computer-based device management apparatus according to claim 1, wherein the storage is further configured to store a respective device identification information for each device of the plurality of devices and to store, in association with the device identification information for each device, a respective provider information of each provider among a respective plurality of providers providing the article consumed or expended by the device, and the notification part is further configured to select, responsive to the determination part determining the determination condition is satisfied for a subject device among the devices, one provider among the respective plurality of providers providing the article consumed or expended by the subject device and to issue and transmit via the network a notification for the action to the provider apparatus associated with one provider selected from the plurality of providers.

9. The processor resource conserving computer-based device management apparatus according to claim 8, wherein the notification part is further configured to select among the plurality of providers on the basis of at least one of (i) a price for each of the plurality of providers to provide the article or (ii) a period of time required for a user to receive the article from each of the plurality of providers.

10. The processor resource conserving computer-based device management apparatus according to claim 1, wherein the storage is further configured to store the determination condition, or the action related to ordering the article, or both, in response to a setting in advance received, via the network, from a user terminal used by a user.

11. The processor resource conserving computer-based device management apparatus according to claim 1, wherein the determination part is further configured to determine whether or not an abnormality has occurred in the device on the basis of the article information received by the receiving part, and the notification part is further configured to issue a notification indicating that the abnormality has occurred in the device, to at least one of the provider apparatus or to a user terminal used by a user, in response to the determination part determining that the abnormality has occurred in the device.

12. The processor resource conserving computer-based device management apparatus according to claim 1, wherein the notification part is further configured such that, in response to an identical user using a first device and a second device of the plurality of devices and the determination part determining that the consumption state or the expending state in the first device satisfies the determination condition, the notification part issues a notification for the action related to the ordering of the article consumed or expended by the first device and issues a notification for the action related to ordering the article consumed or expended by the second device, regardless of whether the consumption state or expending state of the second device satisfies the determination conditions.

13. A processor resource conserving computer-based network-integrated device management method comprising the steps, executed by a processor in a processor-based device management apparatus for managing a plurality of remote devices that consume or expend articles and automatically transmit to the computer-based device management apparatus, through a network, status information indicating the devices' respective consumption or expending of the articles, of:

storing in a storage connected to the processor a device identification information identifying the device or a user of the device, or both, and storing in association with the device identification information a provider information identifying a provider of the article consumed or expended by the device and indicating a provider apparatus associated with the provider and connected to the network;

the processor receiving from the network a status information transmitted by a device among the plurality of devices and including (i) device identification information identifying the device or a user of the device, or both, and (ii) an article information indicating a consumption state or an expending state of the article consumed or expended by the device;

the processor determining, in response to receiving the status information, a determination condition for the device, the determination being based at least on part on the device identification information, and determining whether or not the consumption state or the expending state indicated by the article information in the received status information satisfies the determination condition for the device; and the processor issuing and transmitting, via the network, to the provider apparatus indicated by the provider information stored in the storage in association with the device information received in the status information, on condition that the determination condition is determined to be satisfied in the determining, a notification for an action related to ordering the article consumed or expended in the device identified by the device identification information;

the processor suspending the determining of the determination condition when the device management apparatus issues to the provider apparatus the notification for the action to order the article; and the processor resuming the determining of the determination condition when the device management apparatus receives, via the network, from the device a transmitted information indicating the article has been replenished or replaced in the device.

14. A processor resource conserving device management system comprising:

a plurality of devices that connect to a network and are each configured to consume or expend a respective article; and a device management apparatus that connects to the network and is configured to that manages the plurality of devices, wherein each of the plurality of devices includes:
a detection part configured to detect a consumption state or an expending state of the article, and
a transmission part configured to transmit, via the network, (i) a device identification information for identifying the device or a user of the device, or both, and (ii) an article information indicating the consumption state or the expending state detected by the detecting part, wherein the device management apparatus includes:
a storage that stores, in association with each other, the respective device identification information for the devices and, in association with each device's respective device identification information, a provider information identifying a provider of the article consumed or expended by the device and indicating a provider apparatus associated with the provider and connected to the network,
a receiving part configured to receive from the network, transmitted by any device among the plurality of devices, a status information that includes the device identification information for the device and the article information indicating the consumption state or the expending state detected by the detecting part of the device,
a determination part that is configured to perform, responsive to the receiving part receiving the respective status information transmitted by any of the devices, a processing that determines a determination condition for the device and determines, based in part on the consumption state or the expending state indicated by the article information of the respective status information, whether or not the determination condition for the device is satisfied, and
a notification part that is configured to issue and to transmit via the network, on condition that the determination part determines that the determination condition is satisfied, a notification for an action related to ordering the article consumed or expended by the device identified by the device identification information received by the receiving part, wherein the transmitting is to a provider apparatus associated with the provider identified on the basis of the provider information associated with the device identification information received by the receiving part, wherein the determination part is further configured to suspend, in association with the notification part issuing and transmitting to the provider apparatus the notification for the action to order the article, the processing that determines the determination condition for the device, wherein the receiving part is further configured to receive, from the network, a replenishment notification transmitted by the device, indicating replenishment or replacement in the device of the article, and wherein the determination part is further configured to resume, based on the receiving part receiving the replenishment notification, performing the processing that determines the determination condition for the device.

\* \* \* \* \*